(12) United States Patent
Bi

(10) Patent No.: US 11,899,938 B2
(45) Date of Patent: Feb. 13, 2024

(54) TECHNIQUES TO REDUCE WRITE AMPLIFICATION

(71) Applicant: Micron Technology, Inc., Boise, ID (US)

(72) Inventor: Yanhua Bi, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 297 days.

(21) Appl. No.: 17/283,499

(22) PCT Filed: Dec. 7, 2020

(86) PCT No.: PCT/CN2020/134236
§ 371 (c)(1),
(2) Date: Apr. 7, 2021

(87) PCT Pub. No.: WO2022/120517
PCT Pub. Date: Jun. 16, 2022

(65) Prior Publication Data
US 2022/0404976 A1   Dec. 22, 2022

(51) Int. Cl.
*G06F 3/06* (2006.01)

(52) U.S. Cl.
CPC .......... *G06F 3/0611* (2013.01); *G06F 3/0629* (2013.01); *G06F 3/0659* (2013.01); *G06F 3/0679* (2013.01); *G06F 2212/7204* (2013.01)

(58) Field of Classification Search
CPC .... G06F 3/0611; G06F 3/0629; G06F 3/0659; G06F 3/0679; G06F 3/0616; G06F 3/0656; G06F 2212/7204
See application file for complete search history.

(56) References Cited

U.S. PATENT DOCUMENTS

| | | | |
|---|---|---|---|
| 2013/0232296 A1 | 9/2013 | Yonezawa et al. | |
| 2014/0372678 A1* | 12/2014 | Moon | G06F 12/0246 |
| | | | 711/103 |

(Continued)

FOREIGN PATENT DOCUMENTS

| | | |
|---|---|---|
| CN | 105683897 A | 6/2016 |
| CN | 107506137 A | 12/2017 |

(Continued)

OTHER PUBLICATIONS

ISA/CN, "International Search Report and Written Opinion of the International Searching Authority," issued in connection with Int'l Appl. No. PCT/CN2020/134236, dated Sep. 9, 2021 (7 pages).

*Primary Examiner* — Kalpit Parikh
(74) *Attorney, Agent, or Firm* — Holland & Hart LLP

(57) ABSTRACT

Methods, systems, and devices for techniques to reduce write amplification are described. A memory device may receive a write command from a host device and may determine that a quantity of commands stored in a buffer for execution by a memory array satisfies a first threshold. In some examples, the memory device may identify whether a write amplification parameter associated with the memory array satisfies a second threshold. The memory device may write data associated with the write command to the memory array using a first mode to write the data or a second mode to write the data based on determining that the quantity of commands satisfies the first threshold and/or identifying whether the write amplification parameter satisfies the second threshold. In some examples, the memory device may adjust a value of the first threshold or the second threshold or both based on the write amplification parameter.

17 Claims, 5 Drawing Sheets

(56) References Cited

U.S. PATENT DOCUMENTS

2019/0079702 A1\* 3/2019 Yeon .................. G06F 12/10
2019/0095116 A1\* 3/2019 Igahara ............... G06F 3/0634

FOREIGN PATENT DOCUMENTS

CN      108829346 A    11/2018
CN      110569002 A    12/2019

\* cited by examiner

TECHNIQUES TO REDUCE WRITE AMPLIFICATION

CROSS REFERENCE

The present application for patent is a 371 national phase filing of International Patent Application No. PCT/CN2020/134236 by BI, entitled "TECHNIQUES TO REDUCE WRITE AMPLIFICATION," filed Dec. 7, 2020, assigned to the assignee hereof, and expressly incorporated by reference herein.

FIELD OF TECHNOLOGY

The following relates generally to one or more systems for memory and more specifically to techniques to reduce write amplification.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
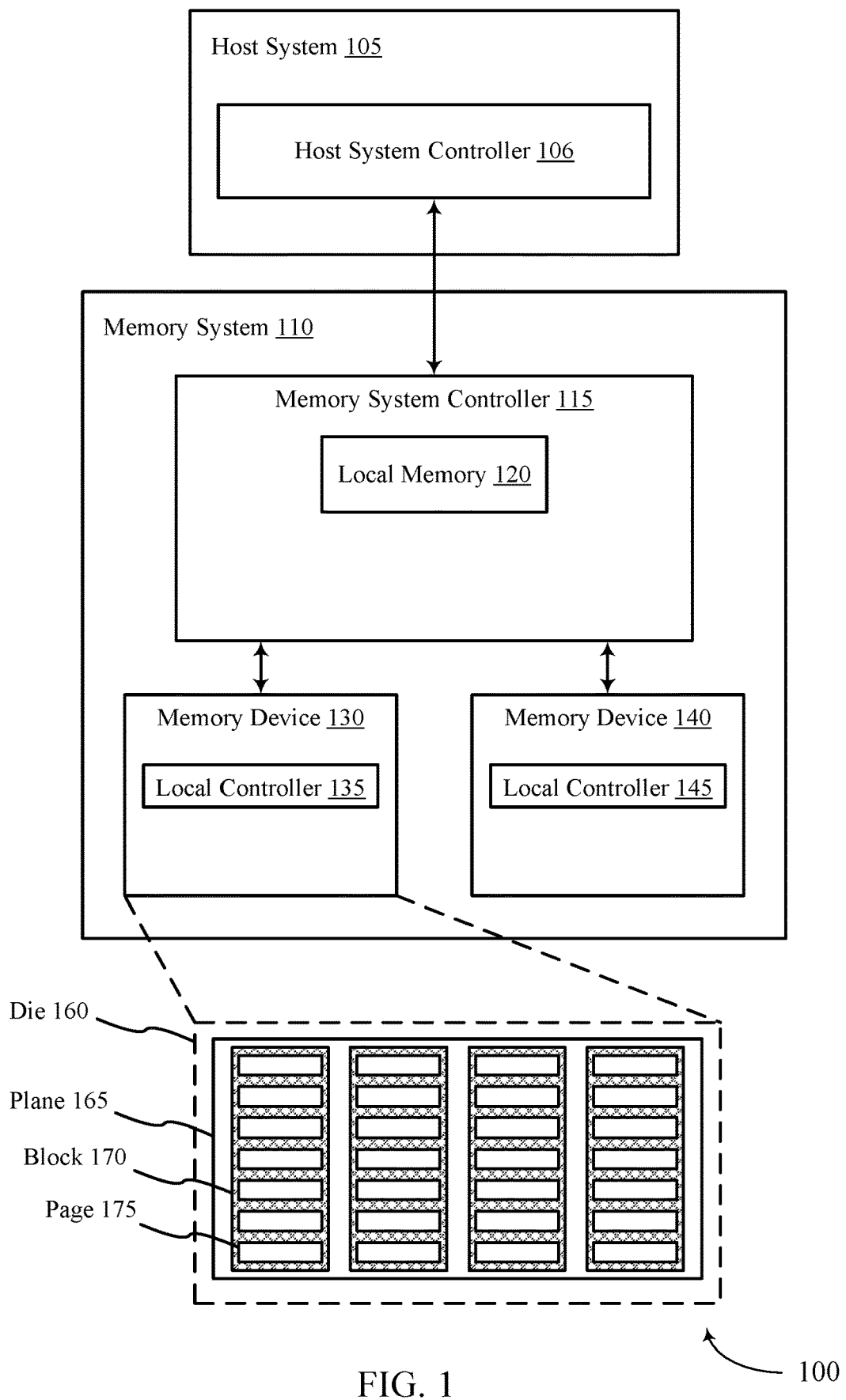
FIG. 1 illustrates an example of a system that supports techniques to reduce write amplification in accordance with examples as disclosed herein.

A NOT-AND (NAND) memory system may write data to one or more memory arrays of the memory system in a single-level cell (SLC) mode, in which each memory cell being written to stores a single bit of the data. In some examples, at a later time, the NAND memory system may rewrite the data to the one or more memory arrays in a multi-level cell (MLC) mode, a triple-level cell (TLC) mode, a quad-level cell (QLC) mode, or other level cell mode to improve the density of information stored in the memory cells. For instance, memory cells written using a non-SLC mode may store two bits of the data, three bits of the data, four bits of the data, or other quantities of bits of data, respectively. Rewriting the data to the memory system in the MLC, TLC, or QLC mode may enable a greater storage density at the memory system which may enable the memory system to store more data than memory systems that use the SLC mode alone.

In some examples, however, writing using the SLC mode and then rewriting using the MLC, TLC, or QLC mode may be associated with a higher write amplification than writing using the SLC mode without performing the rewriting or writing directly using the MLC, TLC, or QLC mode. Having a higher write amplification may lead to the NAND memory system having an increased power consumption, experiencing an increased latency when performing one or more operations, and experience wearout earlier and perhaps shortening the life of the memory array, or a combination thereof. One method to mitigate the increased write amplification may involve the memory system writing using the MLC mode, the TLC mode, or the QLC mode directly without first writing using the SLC mode.

Writing using the MLC mode, the TLC mode, or the QLC mode directly may take more time (e.g., may be associated with more latency) than writing using the SLC mode, which may increase the latency for performing the write command. In examples where the memory system has fewer commands to execute in a buffer (e.g., a queue depth (QD) below a threshold amount), the increased latency associated with writing the data using the MLC, TLC, or QLC mode directly may not create significant additional latency. However, as the quantity of commands that the memory system is to execute in the buffer increases (e.g., as the QD increases), the memory system may experience corresponding increased latency. As latency increases, performance may decrease.

The systems, devices, and methods described herein may enable a NAND memory system to write data using the MLC, TLC, or QLC mode directly when the QD is below the threshold and to write data using the SLC mode (e.g., and later rewriting using the MLC, TLC, or QLC mode) when the QD is above the threshold. For instance, the memory system may receive a write command from a host device and determine that a quantity of commands stored in a buffer for execution by a memory array (e.g., QD) satisfies a first threshold. The memory system may write data associated with the write command to the memory array using a first mode (e.g., the SLC mode) to write the data or a second mode (e.g., the MLC mode, the TLC mode, or the QLC mode) to write the data based on the determining. By performing the writing using the MLC, TLC, or QLC mode when the quantity of commands to execute are below a threshold and performing the writing using the SLC mode when the quantity of commands to execute are above the threshold, the memory system may achieve a write amplification that is, on average, lower while mitigating increased latency that may occur when the quantity of commands to execute are above the threshold.

Features of the disclosure are initially described in the context of systems as described with reference to FIG. 1.

Features of the disclosure are described in the context of a write mode decision flow and a write parameter adjustment decision flow as described with reference to FIGS. 2-3. These and other features of the disclosure are further illustrated by and described with reference to an apparatus diagram and a flowchart that relate to techniques to reduce write amplification as described with reference to FIGS. 4-5.

FIG. 1 is an example of a system 100 that supports techniques to reduce write amplification in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, serial advanced technology attachment (SATA) controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface). The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magnetic RAM (MRAM), NOT-OR (NOR) (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). The memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, the memory device 130 and/or the memory device 140 (e.g., a NAND memory device) may include memory cells configured to each store one bit of information, which may be referred to as SLCs. Additionally or alternatively, the memory device 130 and/or the memory device 140 (e.g., a NAND memory device) may include memory cells configured to each store multiple bits of information, which may be referred to as MLCs if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be rewritten with new data. Thus, for example, a used page 175 may in some cases not be updated until the entire block 170 that includes the page 175 has been erased.

The system 100 may include any quantity of non-transitory computer readable media that support techniques to reduce write amplification. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform associated functions as described herein.

In some examples, a memory system 110 (e.g., a NAND memory system) may write data to one or more dies 160 of the memory system 110 in an SLC mode in response to receiving a write command from a host system 105. At a later time, the memory system 110 may rewrite the data to the one or more dies 160 in an MLC mode, a TLC mode, or a QLC mode, in which each memory cell being written to stores two bits of the data, three bits of the data, or four bits of the data, respectively. Rewriting the data to the memory system 110 in the MLC, TLC, or QLC mode may enable a greater storage density at the memory system 110 which may enable the memory system 110 to store more data than memory systems 110 that use the SLC mode alone.

Writing using the SLC mode and then rewriting using the MLC, TLC, or QLC mode may be associated with a higher write amplification than writing using the SLC mode without performing the rewriting or directing writing the data using the MLC, TLC, or QLC mode initially. Having a higher write amplification may lead to the NAND memory system having an increased power consumption, experiencing an increased latency when performing one or more operations, and experience wearout earlier and shortening the life of the memory array, or a combination thereof. One method to mitigate the increased write amplification may involve the memory system 110 selectively writing using the MLC mode, the TLC mode, or the QLC mode directly without first writing using the SLC mode, in some cases.

Writing using the MLC mode, the TLC mode, or the QLC mode directly may take more time (e.g., may be associated with more latency) than writing using the SLC mode. In examples where the memory system 110 has fewer commands to execute in a buffer (e.g., a QD below a threshold amount), the increased latency associated with writing the data using the MLC, TLC, or QLC mode directly may not create significant additional latency. However, as the quantity of commands that the memory system 110 is to execute in the buffer increases (e.g., as the QD increases), the memory system 110 may experience corresponding increased latency. As latency increases, performance may decrease.

The systems, devices, and methods described herein may enable a memory system 110 to write data using the MLC, TLC, or QLC mode directly when the QD is below the threshold and to write data using the SLC mode (e.g., and later rewriting using the MLC, TLC, or QLC mode) when the QD is above the threshold. For instance, the memory system 110 may receive a write command from a host system 105 and determine that a quantity of commands stored in a buffer for execution by a die 160 (e.g., QD) satisfies a first threshold. The memory system 110 may write data associated with the write command to the die 160 using a first mode (e.g., the SLC mode) to write the data or a second mode (e.g., the MLC mode, the TLC mode, or the QLC mode) to write the data based on the determining. By performing the writing using the MLC, TLC, or QLC mode when the quantity of commands to execute are below a threshold and performing the writing using the SLC mode when the quantity of commands to execute are above the threshold, the memory system 110 may achieve a write amplification that is, on average, lower while mitigating increased latency that may occur when the quantity of commands to execute are above the threshold.

Figure 2:
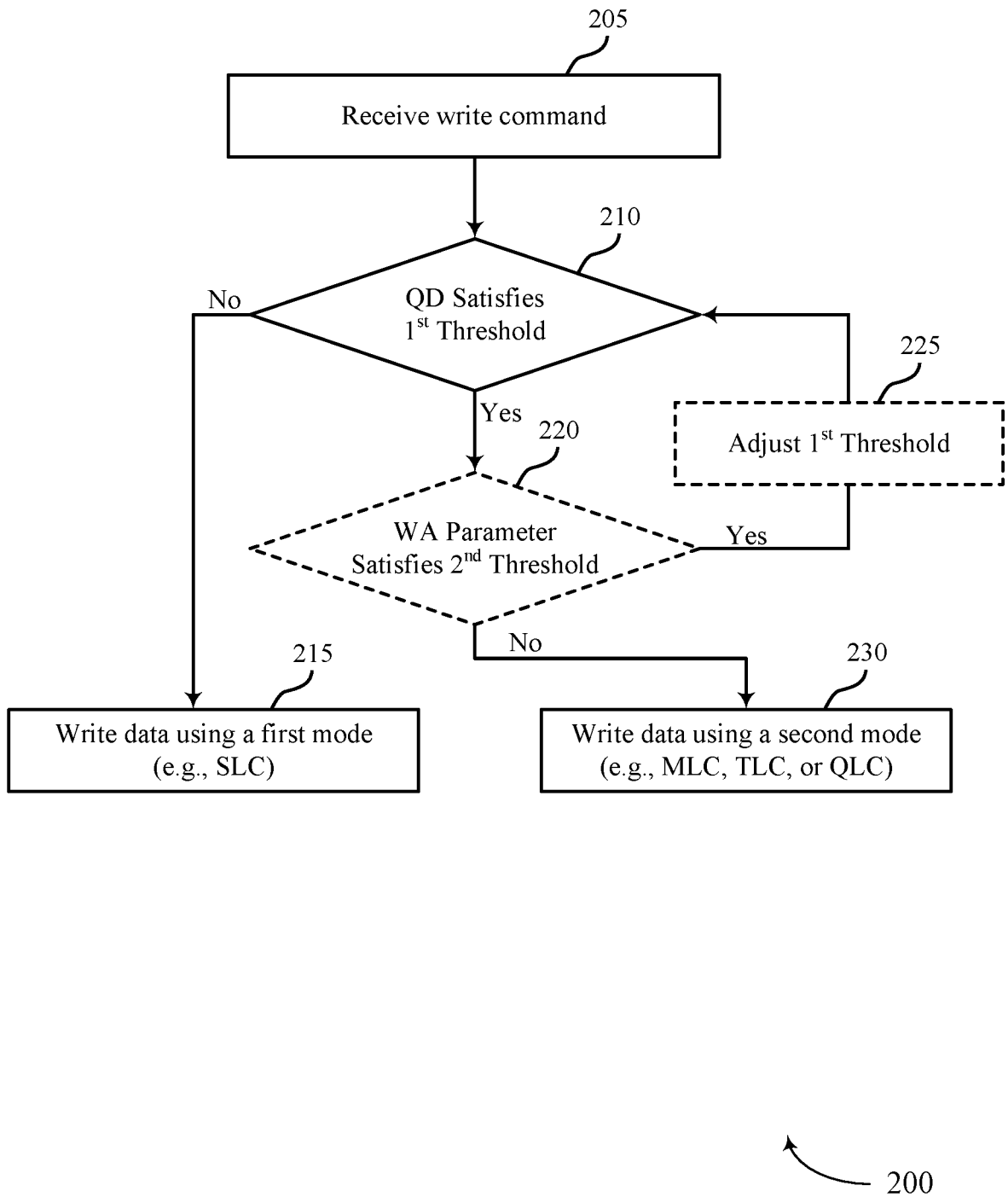
FIG. 2 illustrates an example of a flowchart that supports techniques to reduce write amplification in accordance with examples as disclosed herein.

FIG. 2 illustrates an example of a flowchart 200 that supports techniques to reduce write amplification in accordance with examples as disclosed herein. Aspects of the flowchart 200 may be implemented by a controller, among other components. Additionally or alternatively, aspects of the flowchart 200 may be implemented as instructions stored in memory (e.g., firmware stored in a memory coupled with or included in memory system 110). For example, the instructions, when executed by a controller (e.g., the memory system controller 115, the local controller 135, the local controller 145), may cause the controller to perform the operations of the flowchart 200.

In some examples, a NAND memory system may write data to one or more memory arrays of the memory system in an SLC mode, in which each memory cell being written to stores a single bit of the data. At a later time, the NAND memory system may rewrite the data to the one or more memory arrays in a multi-level cell MLC, TLC, or QLC mode, in which each memory cell being written to stores two bits of the data, three bits of the data, or four bits of the data, respectively. Rewriting the data to the memory system in the MLC, TLC, or QLC mode may enable a greater storage density at the memory system which may enable the memory system to store more data than memory systems that use the SLC mode alone.

In some examples, however, writing using the SLC mode and then rewriting using the MLC, TLC, or QLC mode may be associated with a higher write amplification than writing using the SLC mode without performing the rewriting. Having a higher write amplification may lead to the NAND memory system having an increased power consumption and/or experiencing an increased latency when performing one or more operations. One method to mitigate the increased write amplification may involve the memory system writing using the MLC mode, the TLC mode, or the QLC mode directly without first writing using the SLC mode.

Writing using the MLC mode, the TLC mode, or the QLC mode directly may take more time (e.g., may be associated with more latency) than writing using the SLC mode. In examples where the memory system has fewer commands to execute in a buffer (e.g., a QD below a threshold amount), the increased latency associated with writing the data using the MLC, TLC, or QLC mode directly may not create significant additional latency. However, as the quantity of commands that the memory system is to execute in the buffer increases (e.g., as the QD increases), the memory system may experience corresponding increased latency. As latency increases, performance may decrease. The methods as described herein may enable a NAND memory system to write data using the MLC, TLC, or QLC mode directly when the QD is below the threshold and to write data using the SLC mode (e.g., and later rewriting using the MLC, TLC, or QLC mode) when the QD is above the threshold. In some examples, the QD may correspond to a length of time to perform the commands that are to be executed in the buffer (e.g., rather than being the quantity of commands in the buffer).

For instance, at 205, a write command may be received. For instance, the memory system (e.g., memory system 110) may receive the write command from a host system (e.g., host system 105). The write command may be received at a controller (e.g., memory system controller 115, local controller 135, local controller 145) of the memory system. At 210, it may be determined whether a quantity of commands stored in a buffer for execution by a memory array (e.g., QD) satisfies a first threshold. For instance, the memory system may determine whether the quantity of commands to execute satisfies the first threshold. A controller of the memory system (e.g., memory system controller 115, local controller 135, local controller 145) may perform the determining at 210. If it is determined that QD does not satisfy the first threshold, 215 may be performed at which data associated with the write command to the memory array may be written using the first mode (e.g., SLC). For instance, the memory system may write the data using the first mode. A controller (e.g., memory system controller 115, local controller 135, local controller 145) may write the data using the first mode. However, if it is determined that QD does satisfy the first threshold, it may be determined whether the write amplification parameter satisfies a second threshold at 220.

At 220, it may be identified whether a write amplification parameter (e.g., a value of the write amplification) associated with the memory array satisfies a second threshold. For instance, the memory system may identify whether the write amplification parameter satisfies the second threshold. A controller (e.g., memory system controller 115, local controller 135, local controller 145) may perform the identifying. If the write amplification parameter satisfies the second threshold, the first threshold may be adjusted at 225. However, if the write amplification parameter does not satisfy the second threshold, 230 may be performed at which data associated with the write command to memory array using the second mode (e.g., MLC, TLC, QLC) is written. In some examples, the memory system may write the data to the memory array using the second mode.

At 225, a value of the first threshold may be adjusted. For instance, the memory system may adjust the value of the first threshold. A controller (e.g., memory system controller 115, local controller 135, local controller 145) may perform the adjusting. In some examples, a value of the first threshold may be increased. By increasing the value of the first threshold, it may be less likely that the QD value at 210 will satisfy the first threshold. After adjusting the value of the first threshold, 210 may be performed. In some examples, additionally or alternatively, a value of the second threshold may be adjusted. For instance, the memory system may adjust the value of the second threshold. A controller (e.g., memory system controller 115, local controller 135, local controller 145) may perform the adjusting. In some examples, the value of the second threshold may be increased. By increasing the value of the second threshold, the memory system may make it more likely that the value of the write amplification parameter at 220 will satisfy the second threshold. More details about this procedure may be described herein, for instance, with reference to FIG. 3.

In some cases, a memory system may write the data using the first mode (e.g., SLC mode) or the second mode (e.g., MLC, TLC, or QLC mode) based on determining whether the QD depth satisfies the first threshold at 210. For instance, if the QD is below a threshold value, it may indicate that the memory system has time to write directly using the second mode. Alternatively, if the QD is above a threshold value, it may indicate that the memory system has a high quantity of commands to perform and that reducing the time to perform each command may benefit the overall latency of the memory system.

In some cases, the memory system may want to adjust or tune the first threshold value using the write amplification factor. For instance, if the write amplification factor parameter over a duration of time is above a second threshold, the first threshold may be adjusted upwards so that more data is written using the second mode. Alternatively, if the write amplification factor parameter over a duration of time is below a second threshold, the first threshold may be adjusted downwards so that more data is written using the first mode and the latency of the device is reduced.

In some cases, the memory system may use both the queue depth and the write amplification parameter to determine when to use the first mode to write information (e.g., SLC mode) or a second mode to write information (e.g., MLC, TLC, or QLC mode). In such cases, if either of the first threshold or the second threshold is not satisfied, the memory system may use the first mode to write the information. In some examples, if the queue depth is above the first threshold and regardless of the value of the write amplification parameter, the memory system may write data using the first mode. In some examples, if the queue depth is below the first threshold, the memory system may determine whether to use the first mode or the second mode to write data based on the write amplification factor satisfying the second threshold. In some instances, if the write amplification factor is above the second threshold, the memory system may use the second mode to write the data. In some instances, if the write amplification factor is below the second threshold, the memory system may use the first mode to write the data.

Write amplification may refer to when the actual amount of information physically-written to the storage media is larger than the amount of information requested by the host system to be written. Some memory systems may include memory devices (e.g., NAND memory) that may be erased before the memory devices (or portions thereof) can be rewritten. For example, some memory devices may be erased with a coarser granularity than is used to write the data (e.g., a page may be written by a write operation and a block may be erased by an erase operation). The memory system that most of a block includes invalid data and may determine to erase the block. The memory system may then re-write the data that is still valid in the block to a new block and erase the current block. Such a process to perform these operations may result in moving (or rewriting) user data and metadata more than once, even though the host system did not request that the data be moved or rewritten. Thus, rewriting some data causes an already-used-portion of flash to be read, updated, and written to a new location, together with initially erasing the new location if it was previously used at some point in time. Thus, a write operation may include writing the data request by the host system and writing data at the request of the memory system to perform these memory management operations (e.g., garbage collection operation). In such cases, the write amplification may refer to the ratio of the data actually written during a write operation over the amount of data requested written by the host system. Devices with higher write amplification factors may increase the quantity of writes performed by the memory system and may shorten the time memory system can operate reliably. The increased writes may also consume processing bandwidth of the memory system, which may reduce random write performance (e.g., increase the latency for performing commands).

A queue depth in a memory system may refer to a quantity of pending requests (e.g., commands) received from a host system. When a host system issues a command to a memory system, that command may be stored in queue or a buffer until it can be executed by the memory system. The queue depth may refer to the quantity of commands in the queue at a given time. In some cases, operations or commands initiated by the memory system may also be added to the queue and may be included in a queue depth calculation.

By performing the writing using the MLC, TLC, or QLC mode when the quantity of commands to execute are below the first threshold and performing the writing using the SLC mode when the quantity of commands to execute are above the first threshold, the memory system may achieve a write amplification that is, on average, lower while mitigating increased latency that may occur when the quantity of commands to execute are above the threshold. Additionally, by performing the writing using the MLC, TLC, or QLC mode when the write amplification parameter is below the second threshold and adjusting the first and/or second threshold when the write amplification parameter is above the second threshold, the memory system may make dynamically adjust how often the memory system writes in the SLC mode versus writing in the MLC mode, the TLC mode, or the QLC mode.

Figure 3:
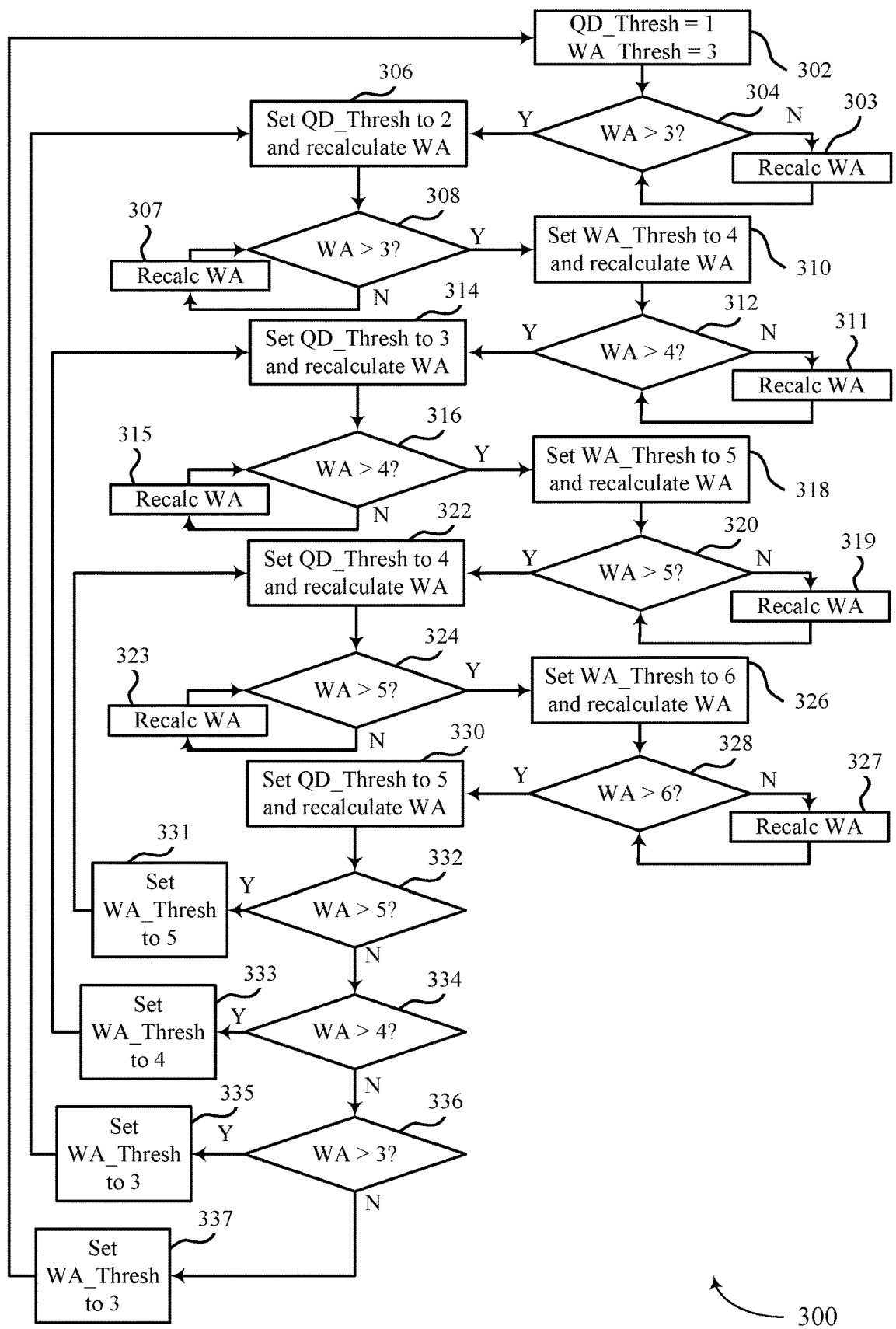
FIG. 3 illustrates an example of a flow chart that supports techniques to reduce write amplification in accordance with examples as disclosed herein.

FIG. 3 illustrates an example of a flowchart 300 that supports techniques to reduce write amplification in accordance with examples as disclosed herein. For instance, the methods as described herein may correspond to a procedure performed by a memory system to determine how to adjust the first threshold and/or the second threshold as described with reference to FIG. 2. For instance, 304, 308, 312, 316, 320, 324, and 328 may correspond to 220 in FIG. 2 and 302, 306, 310, 314, 318, 322, 326, and 330 may correspond to 225 in FIG. 2. Each of the operations as described herein may be performed by a memory system. For instance, aspects of the flowchart 300 may be implemented by a controller, among other components. Additionally or alternatively, aspects of the flowchart 300 may be implemented as instructions stored in memory (e.g., firmware stored in a memory coupled with or included in memory system 110). For example, the instructions, when executed by a controller (e.g., the memory system controller 115, the local controller 135, the local controller 145), may cause the controller to perform the operations of the flowchart 300.

The flowchart 300 describes a process through which the first threshold (e.g., QD_thresh) may be adjusted to adjust the performance of the memory system. The first threshold may be dynamically adjusted based on a change write amplification factor parameter. Using the queue depth and the write amplification parameter to determine what mode to use to write data, may allow a memory system to more finely tune its performance and to maintain latency requirements while also reducing write amplification.

The values of the queue depth, the queue depth threshold, the write amplification factor, and the write amplification threshold used herein are examples of values and are used to indicate when these values adjusted either up or down. The actual values of these values may vary, but their relationships may be inferred from the example values used herein.

Initially, at 302, a first threshold (e.g., QD_thresh) may equal 1 and a second threshold (e.g., WA_thresh) may equal 3. At 304, it may be determined whether a write amplification parameter is greater than 3 (e.g., the value of WA_thresh). If so, 306 may be performed. If not, 303 may be performed, at which the write amplification parameter may be recalculated before 304 is performed. At 306, QD_thresh may be set to be equal to 2 and the write amplification parameter may be recalculated before 308 is performed. At 308, it may be determined if the write amplification parameter is greater than 3 (e.g., the value of WA_thresh). If so, 310 may be performed. If not, 307 may be performed, at which the write amplification parameter may be recalculated before 308 is performed. At 310, WA_thresh may be set to be equal to 4 before 312 is performed.

At 312, it may be determined whether a write amplification parameter is greater than 4 (e.g., the value of WA_thresh). If so, 314 may be performed. If not, 311 may performed, at which the write amplification parameter may be recalculated before 312 is performed. At 314, QD_thresh may be set to be equal to 3 and the write amplification parameter may be recalculated before 316 is performed. At 316, it may be determined if the write amplification parameter is greater than 4 (e.g., the value of WA_thresh). If so, the 318 may be performed. If not, 315 may be performed, at which the write amplification parameter may be recalculated before 316 is performed. At 318, WA_thresh may be set to be equal to 5 before 320 is performed.

At 320, it may be determined whether a write amplification parameter is greater than 5 (e.g., the value of WA_thresh). If so, 322 may be performed. If not, 319 may be performed, at which the write amplification parameter may be recalculated before 320 is performed. At 322, QD_thresh may be set to be equal to 4 and the write amplification parameter may be recalculated before 324 is performed. At 324, it may be determined if the write amplification parameter is greater than 5 (e.g., the value of WA_thresh). If so, 326 may be performed. If not, 323 may be performed, at which the write amplification parameter may be recalculated before 324 is performed. At 326, WA_thresh may be set to be equal to 6 before 328 is performed.

At 328, it may be determined whether a write amplification parameter is greater than 6 (e.g., the value of WA_thresh). If so, 330 may be performed. If not, 327 may be performed, at which the write amplification parameter may be recalculated before 328 is performed. At 330, QD_thresh may be set to be equal to 5 and the write amplification parameter may be recalculated before 332 is performed.

At 332, it may be determined if the write amplification parameter is greater than 5 (e.g., the value of WA_thresh). If so, 331 may be performed at which WA_thresh may be set to 5 before 322 is performed. If not, 334 may be performed.

At 334, it may be determined if the write amplification parameter is greater than 4 (e.g., the value of WA_thresh). If so, 333 may be performed at which WA_thresh may be set to 4 before 314 is performed. If not, 336 may be performed.

At 336, it may be determined if the write amplification parameter is greater than 3 (e.g., the value of WA_thresh). If so, 335 may be performed at which WA_thresh may be set to 3 before 306 is performed. If not, 337 may be performed at which WA_thresh may be set to 3 before 302 is performed.

Figure 4:
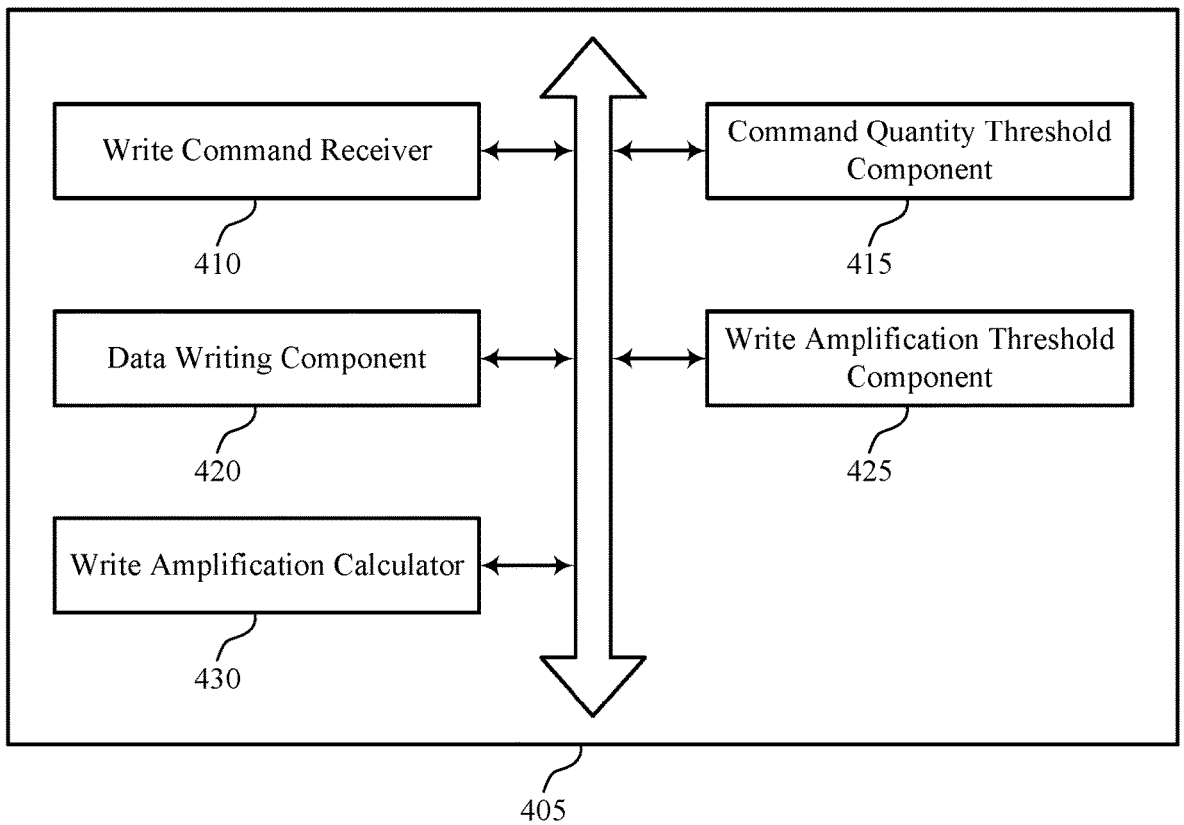
FIG. 4 shows a block diagram of a memory device that supports techniques to reduce write amplification in accordance with examples as disclosed herein.

FIG. 4 shows a block diagram 400 of a memory system 405 that supports techniques to reduce write amplification in accordance with examples as disclosed herein. The memory system 405 may be an example of aspects of a memory system as described with reference to FIGS. 1 through 3.

The memory system 405 may include a write command receiver 410, a command quantity threshold component 415, a data writing component 420, a write amplification threshold component 425, and a write amplification calculator 430. Each of these modules may communicate, directly or indirectly, with one another (e.g., via one or more buses).

The write command receiver 410 may receive a write command from a host device.

The command quantity threshold component 415 may determine whether a quantity of commands stored in a buffer for execution by a memory array satisfies a first threshold. In some examples, the command quantity threshold component 415 may adjust a value of the first threshold based on the value of the write amplification parameter.

The data writing component 420 may write data associated with the write command to the memory array using a first mode to write the data or a second mode to write the data based on determining whether the quantity of commands satisfies the first threshold. In some examples, the data writing component 420 may determine whether to write the data associated with the command to the memory array using the first mode or using the second mode based on determining whether the quantity of commands satisfies the first threshold. In some cases, the first mode includes a single-level cell (SLC) mode associated with memory cells of the memory array. In some cases, the second mode includes a multi-level cell (MLC) mode, a triple-level cell (TLC) mode, or a quad-level cell (QLC) mode associated with the memory cells of the memory array. In some examples, the data may be written using the first mode when the quantity of commands stored in the buffer exceeds the first threshold. In some examples, the data may be written using the second mode when the quantity of commands stored in the buffer is below the first threshold. In some examples, the memory array may be or may include a NAND memory array.

The write amplification threshold component 425 may identify whether a write amplification parameter associated with the memory array satisfies a second threshold, where determining whether to write the data using the first mode or the second mode is based on identifying whether the write amplification parameter satisfies the second threshold. In some examples, the write amplification threshold component 425 may adjust a value of the second threshold based on a value of the write amplification parameter.

The write amplification calculator 430 may calculate a value of write amplification parameter.

Figure 5:
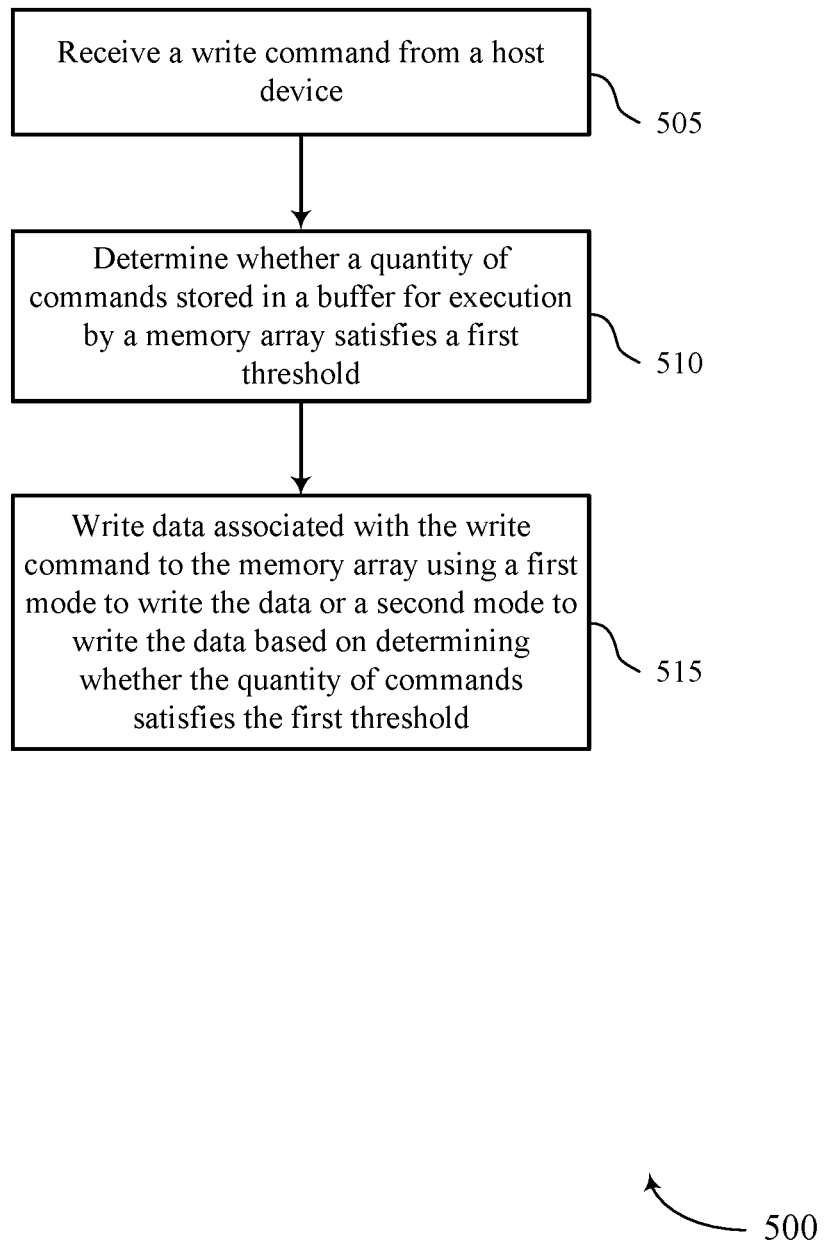
FIG. 5 shows a flowchart illustrating a method or methods that support techniques to reduce write amplification in accordance with examples as disclosed herein.

FIG. 5 shows a flowchart illustrating a method or methods 500 that supports techniques to reduce write amplification in accordance with examples as disclosed herein. The operations of method 500 may be implemented by a memory system or its components as described herein. For example, the operations of method 500 may be performed by a memory system as described with reference to FIG. 4. In some examples, a memory system may execute a set of instructions to control the functional elements of the memory system to perform the described functions. Additionally or alternatively, a memory system may perform aspects of the described functions using special-purpose hardware.

At 505, the memory system may receive a write command from a host device. The operations of 505 may be performed according to the methods described herein. In some examples, aspects of the operations of 505 may be performed by a write command receiver as described with reference to FIG. 4.

At 510, the memory system may determine whether a quantity of commands stored in a buffer for execution by a memory array satisfies a first threshold. The operations of 510 may be performed according to the methods described herein. In some examples, aspects of the operations of 510 may be performed by a command quantity threshold component as described with reference to FIG. 4.

At 515, the memory system may write data associated with the write command to the memory array using a first mode to write the data or a second mode to write the data based on determining whether the quantity of commands satisfies the first threshold. The operations of 515 may be performed according to the methods described herein. In some examples, aspects of the operations of 515 may be performed by a data writing component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for receiving a write command from a host device, determining whether a quantity of commands stored in a buffer for execution by a memory array satisfies a first threshold, and writing data associated with the write command to the memory array using a first mode to write the data or a second mode to write the data based on determining whether the quantity of commands satisfies the first threshold.

Some examples of the method 500 and the apparatus described herein may further include operations, features, means, or instructions for identifying whether a write amplification parameter associated with the memory array satisfies a second threshold, where determining whether to write the data using the first mode or the second mode may be based on identifying whether the write amplification parameter satisfies the second threshold.

Some examples of the method 500 and the apparatus described herein may further include operations, features, means, or instructions for adjusting a value of the second threshold based on a value of the write amplification parameter.

Some examples of the method 500 and the apparatus described herein may further include operations, features, means, or instructions for calculating a value of write amplification parameter, and adjusting a value of the first threshold based on the value of the write amplification parameter.

Some examples of the method 500 and the apparatus described herein may further include operations, features, means, or instructions for determining whether to write the data associated with the command to the memory array using the first mode or using the second mode based on determining whether the quantity of commands satisfies the first threshold.

In some examples of the method 500 and the apparatus described herein, the first mode includes a SLC mode associated with memory cells of the memory array, and the second mode includes a MLC mode, a TLC mode, or a QLC mode associated with the memory cells of the memory array.

In some examples of the method 500 and the apparatus described herein, the data may be written using the first mode when the quantity of commands stored in the buffer exceeds the first threshold.

In some examples of the method 500 and the apparatus described herein, the data may be written using the second mode when the quantity of commands stored in the buffer is below the first threshold.

In some examples of the method 500 and the apparatus described herein, the memory array includes a NAND memory array.

It should be noted that the methods described herein describe possible implementations, and that the operations and the steps may be rearranged or otherwise modified and that other implementations are possible. Further, portions from two or more of the methods may be combined.

An apparatus is described. The apparatus may include a memory array and a controller coupled with the memory array and configured to cause the apparatus to receive a write command from a host device, determine whether a quantity of commands stored in a buffer for execution by the memory array satisfies a first threshold, and write data associated with the write command to the memory array using a first mode to write the data or a second mode to write the data based on determining whether the quantity of commands satisfies the first threshold.

Some examples may include the controller being further configured to cause the apparatus to identify whether a write amplification parameter associated with the memory array satisfies a second threshold, where determining whether to write the data using the first mode or the second mode may be based on identifying whether the write amplification parameter satisfies the second threshold.

Some examples may include the controller being further configured to cause the apparatus to adjust a value of the second threshold based on a value of the write amplification parameter, where writing the data using the first mode or the second mode may be based on adjusting the value of the second threshold.

Some examples may include the controller being further configured to cause the apparatus to determine a value of a write amplification parameter, and adjust a value of the first threshold based on the value of the write amplification parameter, where writing the data using the first mode or the second mode may be based on adjusting the value of the first threshold.

Some examples may include the controller being further configured to cause the apparatus to determine whether to write the data associated with the command to the memory array using the first mode or using the second mode based on determining whether the quantity of commands satisfies the first threshold, where writing the data using the first mode or the second mode may be based on the determination.

In some examples, the first mode includes a SLC mode associated with memory cells of the memory array, and the second mode includes a MLC mode, a TLC mode, or a QLC mode associated with the memory cells of the memory array.

In some examples, the data may be written using the first mode when the quantity of commands stored in the buffer exceeds the first threshold.

In some examples, the data may be written using the second mode when the quantity of commands stored in the buffer may be below the first threshold.

In some examples, the memory array includes a NAND memory array.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a memory array; and
   a controller coupled with the memory array and configured to cause the apparatus to:
   receive a write command from a host device;
   determine whether a quantity of commands stored in a buffer for execution by the memory array satisfies a first threshold;
   if the quantity of commands stored in the buffer fails to satisfy the first threshold, determine a ratio of a total quantity of data written to the memory array to a quantity of data requested to be written to the memory array by the host device; and write data associated with the write command to the memory array using a first mode to write data or a second mode to write data, wherein the data is written using the first mode based at least in part on the quantity of commands satisfying the first threshold or the ratio failing to satisfy a second threshold, and wherein the data is written using the second mode based at least in part on the quantity of commands failing to satisfy the first threshold and the ratio satisfying the second threshold.

2. The apparatus of claim 1, wherein the controller is further configured to cause the apparatus to:

identify whether the ratio satisfies the second threshold, based at least in part on determining the ratio.

3. The apparatus of claim 2, wherein the controller is further configured to:

adjust a value of the second threshold based at least in part on whether the ratio satisfies the second threshold, wherein writing data using the first mode or the second mode is based at least in part on adjusting the value of the second threshold.

4. The apparatus of claim 2, wherein the controller is further configured to:

adjust a value of the first threshold based at least in part on whether the ratio satisfies the second threshold, wherein writing data using the first mode or the second mode is based at least in part on adjusting the value of the first threshold.

5. The apparatus of claim 1, wherein:

the first mode comprises a single-level cell (SLC) mode associated with memory cells of the memory array; and the second mode comprises a multi-level cell (MLC) mode, a triple-level cell (TLC) mode, or a quad-level cell (QLC) mode associated with the memory cells of the memory array.

6. The apparatus of claim 1, wherein the memory array comprises a NOT-AND (NAND) memory array.

7. A non-transitory computer-readable medium storing code comprising instructions which, when executed by a processor of an electronic device, cause the electronic device to:

receive a write command from a host device;

determine whether a quantity of commands stored in a buffer for execution by a memory array satisfies a first threshold;

if the quantity of commands stored in the buffer fails to satisfy the first threshold, determine a ratio of a total quantity of data written to the memory array to a quantity of data requested to be written to the memory array by the host device; and write data associated with the write command to the memory array using a first mode to write data or a second mode to write data, wherein the data is written using the first mode based at least in part on the quantity of commands satisfying the first threshold or the ratio failing to satisfy a second threshold, and wherein the data is written using the second mode based at least in part on the quantity of commands failing to satisfy the first threshold and the ratio satisfying the second threshold.

8. The non-transitory computer-readable medium of claim 7, wherein the instructions, when executed by the processor of the electronic device, further cause the electronic device to:

identify whether the ratio satisfies the second threshold, based at least in part on determining the ratio.

9. The non-transitory computer-readable medium of claim 8, wherein the instructions, when executed by the processor of the electronic device, further cause the electronic device to:

adjust a value of the second threshold based at least in part on whether the ratio satisfies the second threshold, wherein writing data using the first mode or the second mode is based at least in part on adjusting the value of the second threshold.

10. The non-transitory computer-readable medium of claim 8, wherein the instructions, when executed by the processor of the electronic device, further cause the electronic device to:

adjust a value of the first threshold based at least in part on whether the ratio satisfies the second threshold, wherein writing data using the first mode or the second mode is based at least in part on adjusting the value of the first threshold.

11. The non-transitory computer-readable medium of claim 7, wherein:

the first mode comprises a single-level cell (SLC) mode associated with memory cells of the memory array; and the second mode comprises a multi-level cell (MLC) mode, a triple-level cell (TLC) mode, or a quad-level cell (QLC) mode associated with the memory cells of the memory array.

12. The non-transitory computer-readable medium of claim 7, wherein the memory array comprises a NOT-AND (NAND) memory array.

13. A method performed by a memory device, the method comprising:

receiving a write command from a host device;

determining whether a quantity of commands stored in a buffer for execution by a memory array satisfies a first threshold;

if the quantity of commands stored in the buffer fails to satisfy the first threshold, determining a ratio of a total quantity of data written to the memory array to a quantity of data requested to be written to the memory array by the host device; and writing data associated with the write command to the memory array using a first mode to write data or a second mode to write data, wherein the data is written using the first mode based at least in part on the quantity of commands satisfying the first threshold or the ratio failing to satisfy a second threshold, and wherein the data is written using the second mode based at least in part on the quantity of commands failing to satisfy the first threshold and the ratio satisfying the second threshold.

14. The method of claim 13, further comprising:

identifying whether the ratio satisfies the second threshold, based at least in part on determining the ratio.

15. The method of claim 14, further comprising:

adjusting a value of the second threshold based at least in part on whether the ratio satisfies the second threshold, wherein writing data using the first mode or the second mode is based at least in part on adjusting the value of the second threshold.

16. The method of claim 14, further comprising:
adjusting a value of the first threshold based at least in part on the ratio satisfying the second threshold, wherein writing data using the first mode or the second mode is based at least in part on adjusting the value of the first threshold.

17. The method of claim 13, wherein:
the first mode comprises a single-level cell (SLC) mode associated with memory cells of the memory array; and
the second mode comprises a multi-level cell (MLC) mode, a triple-level cell (TLC) mode, or a quad-level cell (QLC) mode associated with the memory cells of the memory array.

* * * * *